(12) United States Patent
Yuan (10) Patent No.: US 11,277,595 B2
(45) Date of Patent: Mar. 15, 2022

(54) WHITE BALANCE METHOD FOR IMAGE AND TERMINAL DEVICE

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 129 days.

(21) Appl. No.: 16/747,289

(22) Filed: Jan. 20, 2020

(65) Prior Publication Data

US 2020/0154086 A1    May 14, 2020

Related U.S. Application Data

(63) Continuation of application No. PCT/CN2018/094086, filed on Jul. 2, 2018.

(30) Foreign Application Priority Data

Jul. 25, 2017 (CN) .......................... 201710612885.4

(51) Int. Cl.
*G06T 7/11* (2017.01)
*G06T 7/13* (2017.01)
(Continued)

(52) U.S. Cl.
CPC ................. *H04N 9/73* (2013.01); *G06T 7/11* (2017.01); *G06T 7/13* (2017.01); *G06T 7/90* (2017.01); *G06T 2207/30201* (2013.01)

(58) Field of Classification Search
CPC ..... G06T 7/11; G06T 7/13; G06T 7/90; G06T 2207/30201; H04N 9/73
See application file for complete search history.

(56) References Cited

U.S. PATENT DOCUMENTS 7,761,000 B2    7/2010  Nakajima
2007/0031060 A1 2/2007  Okada
(Continued)

FOREIGN PATENT DOCUMENTS

CN   1977542 A    6/2007
CN   101262617 A  9/2008
(Continued)

OTHER PUBLICATIONS

Chen et al. ("A novel automatic white balance method for digital still cameras," IEEE International Symposium on Circuits and Systems, Date of Conference: May 23-26, 2005) (Year: 2005).*

(Continued)

*Primary Examiner* — Yubin Hung
(74) *Attorney, Agent, or Firm* — Young Basile Hanlon & MacFarlane, P.C.

(57) ABSTRACT

A white balance method for an image and a terminal device are provided. The image includes a face region and a background region. The method includes extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

17 Claims, 5 Drawing Sheets

(51) Int. Cl.
*G06T 7/90* (2017.01)
*H04N 9/73* (2006.01)

(56) References Cited

U.S. PATENT DOCUMENTS

| | | | | |
|---|---|---|---|---|
| 2009/0310859 A1* | 12/2009 | Lien | .................... | H04N 1/6086 |
| | | | | 382/167 |
| 2010/0026836 A1 | 2/2010 | Sugimoto | | |
| 2010/0245618 A1* | 9/2010 | Ajito | .................... | H04N 9/735 |
| | | | | 348/223.1 |
| 2012/0086828 A1* | 4/2012 | Li | .................... | H04N 9/73 |
| | | | | 348/223.1 |
| 2013/0057726 A1 | 3/2013 | Shimizu | | |
| 2016/0088278 A1* | 3/2016 | Velarde | .................... | H04N 5/2354 |
| | | | | 348/371 |
| 2017/0163953 A1 | 6/2017 | Wang et al. | | |
| 2017/0359559 A1* | 12/2017 | Patel | .................... | H04N 5/275 |

FOREIGN PATENT DOCUMENTS

| | | |
|---|---|---|
| CN | 101420594 A | 4/2009 |
| CN | 101472188 A | 7/2009 |
| CN | 101527860 A | 9/2009 |
| CN | 102111547 A | 6/2011 |
| CN | 104735362 A | 6/2015 |
| CN | 105187810 A | 12/2015 |
| CN | 105894458 A | 8/2016 |
| CN | 106878695 A | 6/2017 |
| CN | 107483906 A | 12/2017 |
| EP | 3188481 A1 | 7/2017 |
| JP | 2011188186 A | 9/2011 |

OTHER PUBLICATIONS

Kondo et al. ("A proposal of ambient light estimation methods for skin region detection," 21st Korea-Japan Joint Workshop on Frontiers of Computer Vision, Date of Conference: Jan. 28-30, 2015) (Year: 2015).*

Hsu et al. ("Region-Based Color Correction of Images," Third International Conference on Information Technology and Applications, Date of Conference: Jul. 4-7, 2005) (Year: 2005).*

Kim et al. ("Automatic white balance based on adaptive feature selection with standard illuminants," 15th IEEE International Conference on Image Processing, Date of Conference: Oct. 12-15, 2008) (Year: 2008).*

Lu, Zhang ("Improved automatic white balance based on Otsu threshold," National Conference on Computing and Communication Systems, Date of Conference: Nov. 21-22, 2012) (Year: 2012).*

International search report, PCT/CN2018/094086, dated Jun. 9, 2018 (2 pages).

First China Office Action for Chinese patent Application 201710612885.4, dated Jun. 8, 2018 (6 pages).

European Search Report, European Application No. 18837675.0, dated Jun. 26, 2020 (8 pages).

English translation of the Chinese First Office Action, Chinese Application No. 201910120250.1, dated Jul. 22, 2020 (14 pages).

Notification to Grant Patent Right for Invention with English Translation of Chinese application No. 201910120250.1, dated Oct. 30, 2020 (6 pages).

Indian Examination Report for IN Application 202017007957 dated May 6, 2021. (6 pages).

* cited by examiner

WHITE BALANCE METHOD FOR IMAGE AND TERMINAL DEVICE

CROSS-REFERENCE TO RELATED APPLICATION(S)

This application is a continuation application of International (PCT) Patent Application No. PCT/CN2018/094086, filed on Jul. 2, 2018, which claims priority to Chinese Patent Application No. 201710612885.4, filed on Jul. 25, 2017, the content of both of which are herein incorporated by reference in their entireties.

TECHNICAL FIELD

The present disclosure generally relates to the technical field of mobile terminal, and in particular to a white balance method for an image, and a terminal device.

BACKGROUND

When users take a shooting, they often encounter a problem of partial colour. For example, an image taken in a room under a fluorescent light will appear green, and a scene taken under a tungsten light indoor will be yellowish, and a photo taken in a daylight shade may be blue.

In order to solve this problem of partial colour, white balance adjustment is required to perform color reproduction. There are various white balance algorithms in the related art, which can be used to calculate a gain value, and a white balance processing is performed based on the gain value. However, for which algorithm is used to calculate the gain value, a user-setting manner is often adopted in the related art, and the users make a select. However, such a user-setting manner in the related art may easily cause the white balance algorithm to not match with an actual scene, resulting in a problem of poor effect for white balance.

SUMMARY

According to one aspect of the present disclosure, a white balance method for an image is provided. The image includes a face region and a background region. The method includes extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

According to another aspect of the present disclosure, a terminal device is provided, including a processor and a non-transitory memory storing a plurality of instructions, when executed causing the processor to perform a white balance method for an image, wherein the method includes: extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

According to yet another aspect of the present disclosure, a non-transitory storage medium is provided, storing a plurality of instructions, when executed, when executed causing the processor to perform a white balance method for an image, wherein the method includes: extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

Additional aspects and advantages of the present disclosure will be set forth in part in the following description. The part may become apparent from the description in the following, or be learnt about from the practice of the present disclosure.

BRIEF DESCRIPTION OF DRAWINGS

The above and/or additional aspects and advantages of the present disclosure will become apparent and readily understood from the following description in accordance with drawings.

DETAILED DESCRIPTION

The embodiments of the present disclosure will be described in detail below. Examples of the embodiments may be illustrated in the drawings. Same or similar reference numerals may be used to indicate same or similar elements or elements having same or similar functions. The embodiments described below with reference to the drawings are illustrative, and are not intended to be construed as limitation to the present disclosure.

A white balance method for an image is provided. The image includes a face region and a background region. The method includes extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

In some embodiments, the extracting a color characteristic from the background region in the image includes: determining distribution locations of pixels of the background region in a preset color space; and counting the distribution locations in the preset color space to obtain a color center and a corresponding color-concentration degree for representing a concentration property of the distribution locations, wherein the color characteristic includes the color center and the color-concentration degree.

In some embodiments, the counting the distribution locations in the preset color space to obtain a color center and a corresponding color-concentration degree for representing a concentration property of the distribution locations includes: utilizing a location where a highest pixel density in the preset color space is as the color center; utilizing a location where a pixel density is decreased to a half of the highest pixel density as an edge of a color-concentration area; and determining a distance from the color center to the edge as the color-concentration degree.

In some embodiments, the counting the distribution locations in the preset color space to obtain a color center and a corresponding color-concentration degree for representing a concentration property of the distribution locations includes: dividing the preset color space into a plurality of regions; determining a number of pixels contained in each of the plurality of regions; utilizing a center of one of the plurality of regions as the color center in response to the one of the plurality of regions having a number of pixels greater than a first threshold, and utilizing the number of pixels contained in the one of the plurality of regions as the color-concentration degree.

In some embodiments, the at least one application condition includes a first application condition corresponding to a mixing light scene. The first application condition corresponding to the mixing light scene includes: the background region including at least two color centers each having a corresponding color-concentration degree greater than a second threshold.

In some embodiments, the at least one application condition includes a second application condition corresponding to a green zone scene. The second application condition corresponding to the green zone scene includes: the background region including at least two color centers; and at least one of the at least two color centers being located in a target region in the preset color space and having a corresponding color-concentration degree less than a second threshold.

In some embodiments, the at least one application condition includes a third application condition corresponding to a solid color background scene. The third application condition corresponding to the solid color background scene includes: the background region including a single color center having a corresponding color-concentration degree greater than a second threshold.

In some embodiments, the method further includes performing a white-balance processing on the face region in the image according to a gray world algorithm in response to the color characteristic being not matched with any of the at least one application condition.

A terminal device is provided, including a processor and a non-transitory memory storing a plurality of instructions, when executed causing the processor to perform a white balance method for an image, wherein the method includes:

extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

In some embodiments, the extracting a color characteristic from the background region in the image includes: determining distribution locations of pixels of the background region in a preset color space; and counting the distribution locations in the preset color space to obtain a color center and a corresponding color-concentration degree for representing a concentration property of the distribution locations, wherein the color characteristic includes the color center and the color-concentration degree.

In some embodiments, the counting the distribution locations in the preset color space to obtain a color center and a corresponding color-concentration degree for representing a concentration property of the distribution locations includes: utilizing a location where a highest pixel density in the preset color space is as the color center; utilizing a location where a pixel density is decreased to a half of the highest pixel density as an edge of a color-concentration area; and determining a distance from the color center to the edge as the color-concentration degree.

In some embodiments, the counting the distribution locations in the preset color space to obtain a color center and a corresponding color-concentration degree for representing a concentration property of the distribution locations includes: dividing the preset color space into a plurality of regions; determining a number of pixels contained in each of the plurality of regions; utilizing a center of one of the plurality of regions as the color center in response to the one of the plurality of regions having a number of pixels greater than a first threshold, and utilizing the number of pixels contained in the one of the plurality of regions as the color-concentration degree.

In some embodiments, the at least one application condition includes a first application condition corresponding to a mixing light scene. The first application condition corresponding to the mixing light scene includes: the background region including at least two color centers each having a corresponding color-concentration degree greater than a second threshold.

In some embodiments, the at least one application condition includes a second application condition corresponding to a green zone scene. The second application condition corresponding to the green zone scene includes: the background region including at least two color centers; and at least one of the at least two color centers being located in a target region in the preset color space and having a corresponding color-concentration degree less than a second threshold.

In some embodiments, the at least one application condition includes a third application condition corresponding to a solid color background scene. The third application condition corresponding to the solid color background scene includes: the background region including a single color center having a corresponding color-concentration degree greater than a second threshold.

In some embodiments, the method further includes performing a white-balance processing on the face region in the image according to a gray world algorithm in response to the color characteristic being not matched with any of the at least one application condition.

A non-transitory storage medium is provided, storing a plurality of instructions, when executed, when executed causing the processor to perform a white balance method for an image, wherein the method includes: extracting a color characteristic from the background region in the image, wherein the color characteristic is configured for indicating color distribution of the background region; matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

In some embodiments, the extracting a color characteristic from the background region in the image includes: determining distribution locations of pixels of the background region in a preset color space; and counting the distribution locations in the preset color space to obtain a color center and a corresponding color-concentration degree for representing a concentration property of the distribution locations, wherein the color characteristic includes the color center and the color-concentration degree.

In some embodiments, the counting the distribution locations in the preset color space to obtain a color center and a corresponding color-concentration degree for representing a concentration property of the distribution locations includes: utilizing a location where a highest pixel density in the preset color space is as the color center; utilizing a location where a pixel density is decreased to a half of the highest pixel density as an edge of a color-concentration area; and determining a distance from the color center to the edge as the color-concentration degree.

In some embodiments, the counting the distribution locations in the preset color space to obtain a color center and a corresponding color-concentration degree for representing a concentration property of the distribution locations includes: dividing the preset color space into a plurality of regions; determining a number of pixels contained in each of the plurality of regions; utilizing a center of one of the plurality of regions as the color center in response to the one of the plurality of regions having a number of pixels greater than a first threshold, and utilizing the number of pixels contained in the one of the plurality of regions as the color-concentration degree.

A white balance method and apparatus for an image, and a terminal device according to embodiments of the present disclosure will be described below with reference to the drawings.

Figure 1:
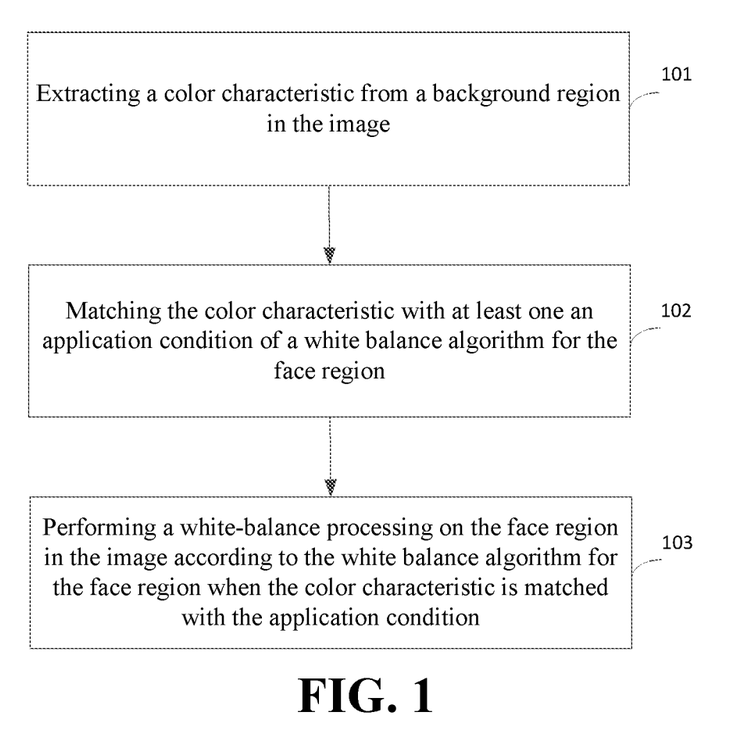
FIG. 1 is a flow chart of a white balance method for an image according to one embodiment of the present disclosure.

FIG. 1 is a flow chart of a white balance method for an image according to one embodiment of the present disclosure. The image in the present embodiment includes a face region. As shown in FIG. 1, the method includes actions/operations in the following blocks.

At block 101, the method extracts a color characteristic from a background region in the image.

The color characteristic is used to indicate color distribution of the background region.

As a possible implementation, for the background region in the image, distribution locations of pixels in the background region are determined in a preset color space, and then distribution locations are counted to obtain a color center and a corresponding color-concentration degree for the distribution locations. The color center and the color-concentration degree are used as the color characteristic, which are configured for representing a concentration property of the distribution locations. Specifically, during a process of determining the color center, a location where a highest pixel density is can be used as the color center, and a location where a pixel density is decreased to a half of the highest pixel density can be used as an edge of a color-concentration area. A distance from the color center to the edge is measured as the color-concentration degree.

As another possible implementation, the preset color space is divided into a plurality of regions, and then, for the background region in the image, the distribution locations of the pixels in the background region are determined in the preset color space. As statistics is performed on each region, the number of pixels contained in each region is determined. For a region where the number of pixels is more than a threshold, the center of the region is used as the color center, and the number of pixels contained in this region is used as the color-concentration degree.

At block 102, the method matches the color characteristic with at least one application condition of a white balance algorithm for the face region.

The white balance algorithm for the face region is used to adjust the face region in the image to be in a skin color.

Specifically, the white balance algorithm for the face region can be applied to multiple scenarios. As a possible implementation, one corresponding application condition can be separately established for each scenario. The color characteristic is then matched with each application condition, that is, the color characteristic is compared with each application condition.

For ease of understanding, the white balance algorithm for the face region will be described below.

The white balance algorithm for the face region is used to adjust the face region in the image to the skin color. As a possible implementation, color components of all the pixels in the face region are obtained, and the color of each pixel is represented by a color vector (R, G, B), and all color vectors of the pixels are averaged to obtain a color vector corresponding to the skin color of a human face. Whether R, G, B values corresponding to the skin color is in a range of R, G, B values corresponding to a normal skin color is determined. If they aren't in the range of R, G, B values corresponding to the normal skin color, the R, G, B values corresponding to the skin color are adjusted with a gain value to make the R, G, B values corresponding to the skin color be in the range of R, G, B values corresponding to the normal skin color. The gain value is called as a first gain value.

The range of R, G, B values corresponding to the normal skin color may be determined from R, G, B values in a color matrix CC. The R, G, B values in the color matrix CC may be obtained from the CIE color space provided by Commission International de L'Eclairage.

Then, a second gain value is calculated using a gray space algorithm. Generally, the second gain value calculated herein is different from the first gain value. For the gray space algorithm, it is assumed that the average value of the saturation of all color components tends to a same gray value, mean values of the R, G, and B components in the color vectors of all the pixels tend to be balanced (1:1:1). A gain value for white balance is calculated based on those values, which is called as the second gain value. Specifically, the face region is divided into a plurality of sub-blocks, and color vectors of all the pixels in each sub-block are obtained. Each pixel is represented by one color vector (R, G, B).

Then, a mean value and a standard deviation of R, G, B in each sub-block are calculated, and the standard deviation of each sub-block is weighted (discarding the sub-blocks with low correlation and retaining the sub-blocks with high correlation) to reduce the influence of a large block with a single color, and make the image colorful. Then, the average value of the R, G, and B channels weighted by the standard deviation is calculated, and the gain coefficients of the R, G, and B channels are finally calculated. Thus, the second gain value is obtained.

Finally, the weights of the first gain value and the second gain value are determined according to an area of the face region. The larger the area of the face region is, the larger the weight of the first gain value is, and the smaller the area of the face region is, the smaller the weight of the first gain value is. A weight operation is performed on the first gain value and the second gain value according to the calculated weights to obtain a final gain value for white balance of the white balance algorithm for the face region. A white-balance processing is performed according to this final gain value.

At block 103, the method performs a white-balance processing on the face region in the image according to the white balance algorithm for the face region when the color characteristic is matched with the application condition.

Specifically, when the color characteristic is matched with the application condition, the image is applicable to the white balance algorithm for the face region. As a possible implementation, there are multiple application conditions. If the color characteristic is matched with at least one application condition, it indicates that the image is applicable to the white balance algorithm for the face region. Then, the image may be white balanced according to the white balance algorithm for the face region, which is configured for adjusting the face region in the image to be in the skin color.

In this embodiment, in the white balance method for the image, a color characteristic is extracted from a background region in the image, and the color characteristic is used to indicate color distribution of the background region. The color characteristic is compared with an application condition of the white balance algorithm for the face region. If the color characteristic is matched with the application condition, the image is white-balanced according to the white balance algorithm for the face region, which is configured for adjusting the face in the image to be in the skin color. The color characteristic of the image is matched with the application condition of the algorithm to determine whether the image is applicable to the white balance algorithm for the face region.

Figure 2:
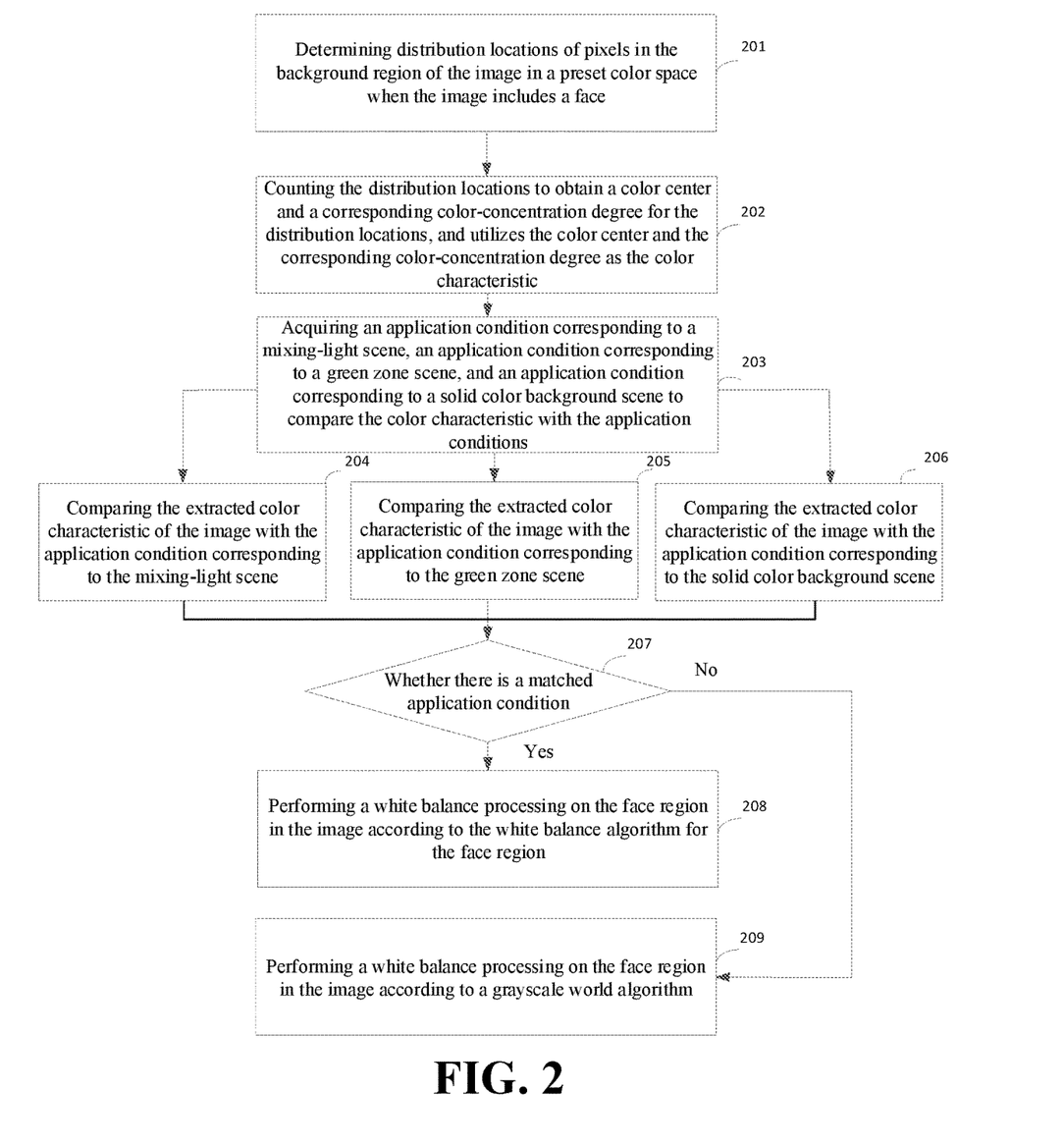
FIG. 2 is a flow chart of a white balance method for an image according to another embodiment of the present disclosure.

FIG. 2 is a flow chart of a white balance method for an image according to another embodiment of the present disclosure. Compared with the above embodiments, the present embodiment provides multiple application conditions of the white balance algorithm for the face region.

As shown in FIG. 2, the method includes actions/operations in the following blocks.

At block 201, the method determines distribution locations of pixels in the background region of the image in a preset color space when the image includes a face region.

There may be multiple color spaces.

For example, an RGB (red, green, blue) color space, which is a color space based on three primary colors of a device.

Further, there may also be HSI color space. The HSI color space describes color using a hue, saturation or chroma, and intensity or brightness from a human visual system. The HSI color space can be described by a conical space model.

Certainly, other color spaces may be used for description, which are not described in this embodiment.

At block 202, the method counts the distribution locations to obtain a color center and a corresponding color-concentration degree for the distribution locations, and utilizes the color center and the corresponding color-concentration degree as the color characteristic.

Specifically, during a process of determining the color center, a location where a highest pixel density is can be used as the color center, and a location where a pixel density is decreased to a half of the highest pixel density can be used as an edge of a color-concentration area. A distance from the color center to the edge is measured as the color-concentration degree.

At block 203, the method acquires an application condition corresponding to a mixing-light scene, an application condition corresponding to a green zone scene, and an application condition corresponding to a solid color background scene, so as to compare the color characteristic with the plurality of application conditions.

Specifically, the white balance algorithm for the face region can be applied to multiple scenarios. For each scenario, a corresponding application condition is preset for describing color characteristics of a corresponding scene. If the color characteristic of the image is matched with color characteristics of one scene, the white balance algorithm for the face region is applicable for the image.

At block 204, the method compares the extracted color characteristic of the image with the application condition corresponding to the mixing-light scene.

For the mixing-light scene, the image is imaged under at least two light sources with different color temperatures. In order to identify the scene, the application condition corresponding to the mixing-light scene is set, which includes the following.

The background region includes at least two color centers each of which has a color-concentration degree greater than a threshold.

Due to the illumination of light sources with different color temperatures, such as illumination of mixing-light of an incandescent lamp and a tungsten lamp, different partial colour occur. Thus, a color center corresponding to the light source is presented in the color space.

At block 205, the method compares the extracted color characteristic of the image with the application condition corresponding to the green zone scene.

For the green zone scene, the image contains a large area of green zone. The application condition corresponding to the green zone scene is set, which includes the following.

The background region includes at least two color centers.

At least one of the at least two color centers is located in a target region of the color space and has a corresponding color-concentration degree less than a threshold.

The target region herein is a target region corresponding to the green zone.

At block 206, the method compares the extracted color characteristic of the image with the application condition corresponding to the solid color background scene.

For the solid background scene, the image contains a large area with a single color. The application condition corresponding to the solid background scene is set, which is includes the following.

The background region contains a single color center, and the color center has a corresponding color-concentration degree greater than a threshold.

Since the solid color background may cause interference to a traditional gray space algorithm, the color reproduction degree is not high, and effect for the white balance is not ideal. If the image contains a human face, it is suitable to perform a white balance processing on the image using the white balance algorithm for the face region.

At block 207, the method determines whether there is a matched application condition. If it is, the block 208 is performed, otherwise block 209 is performed.

At block 208, the method performs a white balance processing on the face region in the image according to the white balance algorithm for the face region.

Specifically, the white balance algorithm for the face region has been described in the foregoing embodiments, and the details are not described in this embodiment.

At block 209, the method performs a white balance processing on the face region in the image according to a grayscale world algorithm.

Specifically, if any of the application conditions do not match with the color characteristic of the image, a white balance processing is performed on the image according to the grayscale world algorithm.

For ease of understanding, the gray world algorithm will be briefly described below.

The human visual system has color constancy, and can obtain invariant color characteristics of a surface of an object under a changed illumination environment and imaging condition. However, the imaging device does not have an adjustment function, and different illumination environments may result in a certain degree of color deviation between the color of the image and the true color. Therefore, it is necessary to select an appropriate white balance algorithm to eliminate the influence of the illumination environment on color appearance. The gray world algorithm is based on the gray world assumption, which assumes that for an image with a large amount of color variations, the mean value of the R, G, and B components tends to a same gray value. Physically, the gray world method assumes that the mean of the average reflection of light on the natural scene is generally a fixed value, which is approximately "grey". A color balance algorithm enforces this assumption on an image to be processed, and then effect of ambient light can be eliminated from the image to obtain the original scene image.

In this embodiment, a color characteristic is extracted from a background region in the image, and the color characteristic is used to indicate color distribution of the background region. The color characteristic is compared with an application condition of the white balance algorithm for the face region. If the color characteristic is matched with the application condition, the image is white-balanced according to the white balance algorithm for the face region, which is configured for adjusting the face in the image to be in the skin color. The color characteristic of the image is matched with the application condition of the algorithm to determine whether the image is applicable to the white balance algorithm for the face region.

Figure 3:
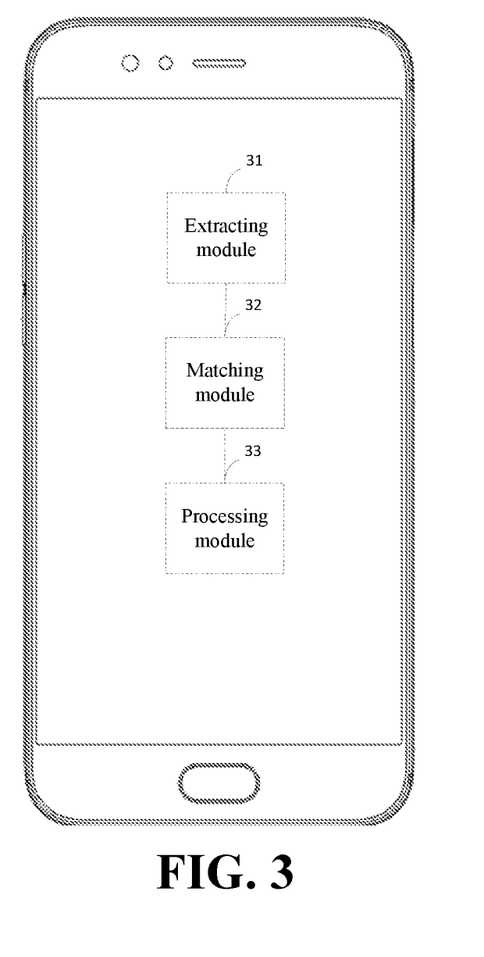
FIG. 3 is a structural schematic view of a white balance apparatus for an image according to one embodiment of the present disclosure.

In order to implement the above embodiments, a white balance apparatus for an image is provided in the present disclosure. FIG. 3 is a structural schematic view of a white balance apparatus for an image according to one embodiment of the present disclosure. The image includes a face. As shown in FIG. 3, the white balance apparatus includes an extracting module 31, a matching module 32, and a processing module 33.

The extracting module 31 is configured for extracting a color characteristic from a background region in the image.

The color characteristic is configured for indicating color distribution of the background region;

The matching module 32 is configured for matching the color characteristic with at least one application condition of a white balance algorithm for the face region.

The white balance algorithm for the face region is configured to adjust the face in the image to be in a skin color; and The processing module 33 is configured for performing a white-balance processing on the face region in the image according to the white balance algorithm for the face region if the color characteristic is matched with the application condition.

In one possible implementation of the present embodiment, there are multiple application conditions. When the color characteristic is matched with at least one application condition, it is determined that the image is applicable to the white balance algorithm for the face region. Then, the image may be white balanced according to a white balance algorithm for the face region.

Further, the processing module 33 is further configured for performing a white balance processing on the image according to a grayscale world algorithm if the color characteristic is not matched with the application condition after matching the application condition of the white balance algorithm for the face region.

In the white balance apparatus for the image, a color characteristic is extracted from a background region in the image, and the color characteristic is used to indicate color distribution of the background region. The color characteristic is compared with an application condition of the white balance algorithm for the face region. If the color characteristic is matched with the application condition, the image is white-balanced according to the white balance algorithm for the face region, which is configured for adjusting the face in the image to be in the skin color. Since a manner of the color characteristic of the image being matched with the application conditions of the algorithm is used to determine whether the image is applicable to the white balance algorithm for the face region, a problem of poor effect for white balance due to the user-setting manner in the related art is solved.

It should be noted that the foregoing description of the embodiments for the white balance method is also applicable to the white balance apparatus in embodiments of the present disclosure, and the implementation principle is similar, which is not described herein again.

Figure 4:
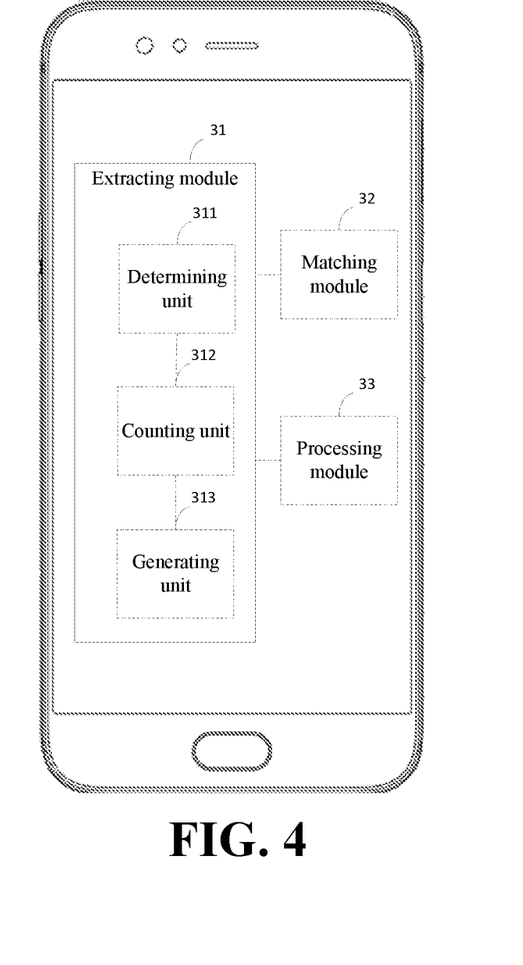
FIG. 4 is a structural schematic view of a white balance apparatus for an image according to another embodiment of the present disclosure.

FIG. 4 is a structural schematic view of a white balance apparatus for an image according to another embodiment of the present disclosure. As shown in FIG. 4, based on what in FIG. 3, in the white balance apparatus, the extracting module 31 further includes a determining unit 311, a counting unit 312, and a generating unit 313.

The determining unit 311 is configured for determining distribution locations of pixels in the background region in a preset color space, for a background region in the image.

The counting unit 312 is configured for counting the distribution locations to obtain a color center of the distribution locations and a corresponding color-concentration degree.

As a possible implementation of the present embodiment, the counting unit is further configured for the following.

Firstly, a location where a highest pixel density is used as the color center, and then a location where a pixel density is decreased to a half of the highest pixel density is used as an edge of a color-concentration area. Finally, a distance from the color center to the edge is measured as the color-concentration degree.

As another possible implementation of the present embodiment, the counting unit is further configured for the following.

The color space is divided into a plurality of regions, and then, for the background region in the image, the distribution locations of the pixels in the background region are determined in the preset color space. For a region where the number of pixels is more than a threshold, the center of the region is used as the color center, and the number of pixels contained in this region is used as the color-concentration degree.

The generating unit 313 is configured for utilizing the color center and the color-concentration degree as the color characteristic.

Further, in this embodiment, there are multiple application conditions, which include at least one of an application condition corresponding to a mixing light scene, an application condition corresponding to a green zone scene, and an application condition corresponding to a solid color background scene.

The application condition corresponding to the mixing light scene includes the background region including at least two color centers each having a color-concentration degree greater than a threshold.

The application condition corresponding to the green zone scene includes the background region including at least two color centers; and at least one of the at least two color centers being located in a target region in the preset color space and having the color-concentration degree less than a threshold.

The application condition corresponding to the solid color background scene includes the background region comprising a single color center having a color-concentration degree greater than a threshold.

It should be noted that the foregoing description of the embodiments for the white balance method is also applicable to the white balance apparatus in embodiments of the present disclosure, and the implementation principle is similar, which is not described herein again.

Figure 5:
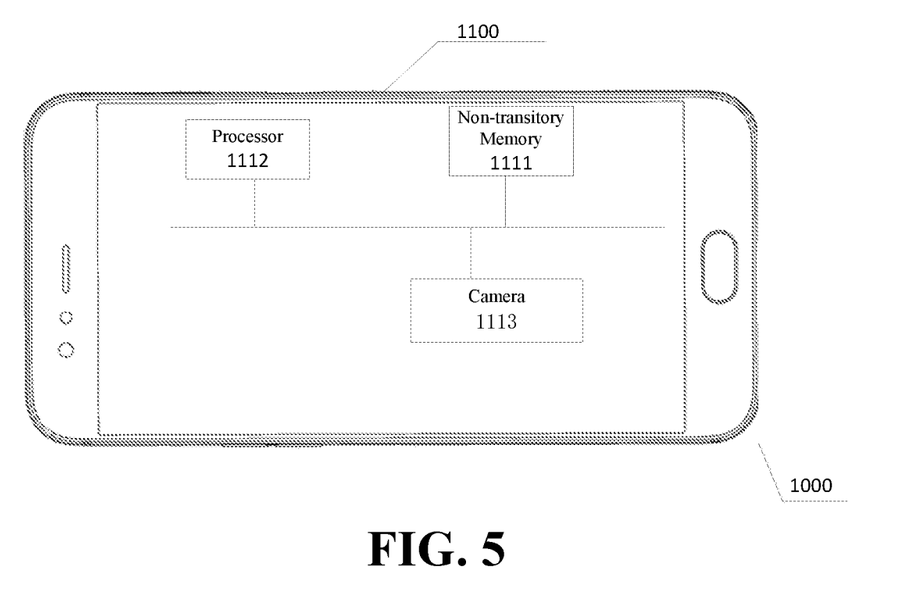
FIG. 5 is a structural schematic view of a terminal device according to one embodiment of the present disclosure.

In order to implement the above embodiments, a terminal device is provided in the present disclosure. FIG. 5 is a structural schematic view of a terminal device according to one embodiment of the present disclosure. As shown in FIG. 5, the terminal device 1000 includes a housing 1100 and a camera 1113, a non-transitory memory 1111, and a processor 1112 located within the housing 1100.

The non-transitory memory 1111 stores executable program codes, and the processor 1112 executes programs corresponding to the executable program codes by reading the executable program code stored in the non-transitory memory 1111 to perform the following.

extracting a color characteristic from the background region in the image, wherein the color characteristic is configured for indicating color distribution of the background region;

matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition.

It should be noted that the foregoing description of the embodiments for the white balance method is also applicable to the terminal device in embodiments of the present disclosure, and the implementation principle is similar, which is not described herein again.

In summary, in the terminal device, a color characteristic is extracted from a background region in the image, and the color characteristic is used to indicate color distribution of the background region. The color characteristic is compared with an application condition of the white balance algorithm for the face region. If the color characteristic is matched with the application condition, the image is white-balanced according to the white balance algorithm for the face region, which is configured for adjusting the face in the image to be in the skin color. The color characteristic of the image is matched with the application condition of the algorithm to determine whether the image is applicable to the white balance algorithm for the face region.

In order to implement the above embodiments, a computer readable storage medium is provided in the present disclosure, which stores a computer program, when is executed by a processor to implement a white balance method is first aspect.

In the description of the present specification, the description with reference to the terms "one embodiment", "some embodiments", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, various embodiments or examples described in the specification and features of various embodiments or examples, may be incorporated and combined by those skilled in the art in case of an absence of confliction.

Although explanatory embodiments of the present disclosure have been shown and described, it would be appreciated by those skilled in the art that the above embodiments are illustrative, and cannot be construed to limit the present disclosure. Changes, modifications, alternatives, and transformation can be made to the embodiments by those skilled in the art without departing from scope of the present disclosure.

What is claimed is:

1. A method for white balancing an image, wherein the image comprises a face region and a background region, the method comprising:

extracting a color characteristic from the background region in the image, wherein the color characteristic is configured for indicating color distribution of the background region;

matching the color characteristic with at least one application condition of a white balance algorithm for the face region, wherein the white balance algorithm is configured to adjust the face region in the image to be in a skin color; and performing a white-balance processing on the face region in the image according to the white balance algorithm in response to the color characteristic being matched with a corresponding one of the at least one application condition, wherein the extracting the color characteristic from the background region in the image comprises:

determining distribution locations of pixels of the background region in a preset color space; and counting the distribution locations in the preset color space to obtain a color center and a corresponding color-concentration degree for representing a concentration property of the distribution locations, wherein the color characteristic comprises the color center and the color-concentration degree.

2. The method of claim 1, wherein the counting the distribution locations in the preset color space to obtain the color center and the corresponding color-concentration degree for representing the concentration property of the distribution locations comprises:
   utilizing a location where a highest pixel density in the preset color space is as the color center;
   utilizing a location where a pixel density is decreased to a half of the highest pixel density as an edge of a color-concentration area corresponding to the color center; and
   determining a distance from the color center to the edge as the color-concentration degree corresponding to the color center.

3. The method of claim 1, wherein the counting the distribution locations in the preset color space to obtain the color center and the corresponding color-concentration degree for representing the concentration property of the distribution locations comprises:
   dividing the preset color space into a plurality of regions;
   determining a number of pixels contained in each of the plurality of regions, the number of pixels being in the image whose colors fall in the region of the preset color space; and
   utilizing a center of one of the plurality of regions as the color center in response to the one of the plurality of regions having a number of pixels greater than a first threshold, and utilizing the number of pixels contained in the one of the plurality of regions as the color-concentration degree.

4. The method of claim 1, wherein the at least one application condition comprises a first application condition corresponding to a mixing light scene; and
   the first application condition corresponding to the mixing light scene comprises:
      the background region comprising at least two color centers each having a corresponding color-concentration degree greater than a second threshold.

5. The method of claim 1, wherein the at least one application condition comprises a second application condition corresponding to a green zone scene; and
   the second application condition corresponding to the green zone scene comprises:
      the background region comprising at least two color centers; and
      at least one of the at least two color centers being located in a target region in the preset color space and having a corresponding color-concentration degree less than a second threshold.

6. The method of claim 1, wherein the at least one application condition comprises a third application condition corresponding to a solid color background scene; and
   the third application condition corresponding to the solid color background scene comprises:
      the background region comprising a single color center having a corresponding color-concentration degree greater than a second threshold.

7. The method of claim 1, further comprising:
   performing a white-balance processing on the face region in the image according to a gray world algorithm in response to the color characteristic being not matched with any of the at least one application condition.

8. A terminal device comprising a processor and a non-transitory processor-readable memory storing a plurality of instructions, when executed causing the processor to perform a white balance method for an image, wherein the method comprises:
   extracting a color characteristic from a background region in the image, wherein the color characteristic is configured for indicating color distribution of the background region;
   matching the color characteristic with at least one application condition of a white balance algorithm for a face region in the image, wherein the white balance algorithm is configured to adjust the face region in the image to be in a skin color; and
   performing a white-balance processing on the face region in the image according to the white balance algorithm in response to the color characteristic being matched with a corresponding one of the at least one application condition,
   wherein the extracting the color characteristic from the background region in the image comprises:
      determining distribution locations of pixels of the background region in a preset color space; and
      counting the distribution locations in the preset color space to obtain a color center and a corresponding color-concentration degree for representing a concentration property of the distribution locations, wherein the color characteristic comprises the color center and the color-concentration degree.

9. The terminal device of claim 8, wherein the counting the distribution locations in the preset color space to obtain the color center and the corresponding color-concentration degree for representing the concentration property of the distribution locations comprises:
   utilizing a location where a highest pixel density in the preset color space is as the color center;
   utilizing a location where a pixel density is decreased to a half of the highest pixel density as an edge of a color-concentration area corresponding to the color center; and
   determining a distance from the color center to the edge as the color-concentration degree corresponding to the color center.

10. The terminal device of claim 8, wherein the counting the distribution locations in the preset color space to obtain the color center and the corresponding color-concentration degree for representing the concentration property of the distribution locations comprises:
    dividing the preset color space into a plurality of regions;
    determining a number of pixels contained in each of the plurality of regions, the number of pixels being in the image whose colors fall in the region of the preset color space; and
    utilizing a center of one of the plurality of regions as the color center in response to the one of the plurality of regions having a number of pixels greater than a first threshold, and utilizing the number of pixels contained in the one of the plurality of regions as the color-concentration degree.

11. The terminal device of claim 8, wherein the at least one application condition comprises a first application condition corresponding to a mixing light scene; and
    the first application condition corresponding to the mixing light scene comprises:
       the background region comprising at least two color centers each having a corresponding color-concentration degree greater than a second threshold.

12. The terminal device of claim 8, wherein the at least one application condition comprises a second application condition corresponding to a green zone scene; and
the second application condition corresponding to the green zone scene comprises:
the background region comprising at least two color centers; and
at least one of the at least two color centers being located in a target region in the preset color space and having a corresponding color-concentration degree less than a second threshold.

13. The terminal device of claim 8, wherein the at least one application condition comprises a third application condition corresponding to a solid color background scene; and
the third application condition corresponding to the solid color background scene comprises:
the background region comprising a single color center having a corresponding color-concentration degree greater than a second threshold.

14. The terminal device of claim 8, further comprising:
performing a white-balance processing on the face region in the image according to a gray world algorithm in response to the color characteristic being not matched with any of the at least one application condition.

15. A non-transitory processor-readable storage medium storing a plurality of instructions, when executed causing a processor to perform a white balance method for an image, wherein the method comprises:
extracting a color characteristic from a background region in the image, wherein the color characteristic is configured for indicating color distribution of the background region;
matching the color characteristic with at least one application condition of a white balance algorithm for a face region in the image, wherein the white balance algorithm is configured to adjust the face region in the image to be in a skin color; and
performing a white-balance processing on the face region in the image according to the white balance algorithm in response to the color characteristic being matched with a corresponding one of the at least one application condition,
wherein the extracting the color characteristic from the background region in the image comprises:
determining distribution locations of pixels of the background region in a preset color space; and
counting the distribution locations in the preset color space to obtain a color center and a corresponding color-concentration degree for representing a concentration property of the distribution locations, wherein the color characteristic comprises the color center and the color-concentration degree.

16. The non-transitory storage medium of claim 15, wherein the counting the distribution locations in the preset color space to obtain the color center and the corresponding color-concentration degree for representing the concentration property of the distribution locations comprises:
utilizing a location where a highest pixel density in the preset color space is as the color center;
utilizing a location where a pixel density is decreased to a half of the highest pixel density as an edge of a color-concentration area corresponding to the color center; and
determining a distance from the color center to the edge as the color-concentration degree corresponding to the color center.

17. The non-transitory storage medium of claim 15, wherein the counting the distribution locations in the preset color space to obtain the color center and the corresponding color-concentration degree for representing the concentration property of the distribution locations comprises:
dividing the preset color space into a plurality of regions;
determining a number of pixels contained in each of the plurality of regions, the number of pixels being in the image whose colors fall in the region of the preset color space; and
utilizing a center of one of the plurality of regions as the color center in response to the one of the plurality of regions having a number of pixels greater than a first threshold, and utilizing the number of pixels contained in the one of the plurality of regions as the color-concentration degree.

* * * * *